(12) United States Patent
Gajic

(10) Patent No.: US 8,340,930 B2
(45) Date of Patent: Dec. 25, 2012

(54) ARRANGEMENT FOR PROTECTING EQUIPMENT OF A POWER SYSTEM

(75) Inventor: Zoran Gajic, Västerås (SE)

(73) Assignee: ABB Technology AG (CH)

( * ) Notice: Subject to any disclaimer, the term of this patent is extended or adjusted under 35 U.S.C. 154(b) by 0 days.

(21) Appl. No.: 13/326,597

(22) Filed: Dec. 15, 2011

(65) Prior Publication Data
US 2012/0081817 A1 Apr. 5, 2012

Related U.S. Application Data

(63) Continuation of application No. PCT/EP2009/057350, filed on Jun. 15, 2009.

(51) Int. Cl.
*G01R 31/08* (2006.01)
*G06F 17/40* (2006.01)
*G06F 19/00* (2011.01)

(52) U.S. Cl. ............ 702/59; 73/865.9; 307/51; 324/512; 324/520; 324/522; 361/65; 361/69; 700/293; 700/294; 702/64; 702/65; 702/187; 702/189; 708/200

(58) Field of Classification Search .................. 73/432.1, 73/865.9; 307/43, 51; 324/72, 76.11, 500, 324/512, 520, 521, 522; 361/1, 62, 65, 78, 361/79; 700/90, 286, 292, 293, 294; 702/1, 702/57, 58, 59, 64, 65, 127, 182, 187, 189; 708/100, 105, 200
See application file for complete search history.

(56) References Cited

U.S. PATENT DOCUMENTS

| | | | |
|---|---|---|---|
| 3,048,744 A * | 8/1962 | Cortlandt Warrington | 361/65 |
| 3,535,591 A * | 10/1970 | Holmquest | 361/78 |
| 4,230,982 A * | 10/1980 | De Mesmaeker | 324/521 |
| 4,249,124 A * | 2/1981 | De Mesmaeker | 324/521 |
| 4,511,981 A * | 4/1985 | Andow et al. | 700/294 |
| 5,402,071 A * | 3/1995 | Bastard et al. | 324/509 |
| 7,710,698 B2 * | 5/2010 | Gajic et al. | 361/62 |

(Continued)

FOREIGN PATENT DOCUMENTS

| WO | 0182444 A1 | 11/2001 |
|---|---|---|
| WO | 2007048045 A2 | 4/2007 |

OTHER PUBLICATIONS

International Preliminary Report on Patentability; Application No. PCT/EP2009/057350; Issued: Sep. 15, 2011; 7 pages.
International Search Report and Written Opinion of the International Searching Authority; Application No. PCT/EP2009/057350; Issued: Mar. 16, 2010; Mailing Date: Mar. 23, 2010; 13 pages.

(Continued)

*Primary Examiner* — Edward Cosimano
(74) *Attorney, Agent, or Firm* — St. Onge Steward Johnston & Reens LLC

(57) ABSTRACT

An arrangement for protecting equipment of an AC electrical power system comprises first means configured to measure the frequency of the current and voltage at at least one location in the electrical power system along an interconnection between two theoretical electric machines of an equivalent two machine system. Fourth means are configured to use the values of the frequency of the current and voltage measured to determine whether a power swing has occurred and if an occurrence of a power swing has been determined determine whether the measuring location is located on a motor side or a generator side of a potential pole slip electrical centre along said interconnection, the electrical centre being defined as the location where the voltage becomes zero during a pole slip, and send this information further to third means for use in a control for protecting equipment of the electrical power system.

19 Claims, 4 Drawing Sheets

U.S. PATENT DOCUMENTS

| | | | |
|---|---|---|---|
| 7,930,117 B2 * | 4/2011 | Guzman-Casillas | 702/60 |
| 8,102,634 B2 * | 1/2012 | Gajic et al. | 361/87 |
| 2003/0200038 A1 | 10/2003 | Schweitzer, III et al. | |
| 2008/0036559 A1 * | 2/2008 | Gajic et al. | 335/7 |
| 2009/0088989 A1 * | 4/2009 | Guzman-Casillas | 702/58 |
| 2009/0089608 A1 | 4/2009 | Guzman-Casillas | |
| 2010/0202092 A1 * | 8/2010 | Gajic et al. | 361/87 |

OTHER PUBLICATIONS

IEEE PSRC Tutorial 95 TP 102; "IEEE Tutorial on the Protection of Synchronous Generators"; 83 pages.

F, Ilar; "Innovations in the Detection of Power Swings in Electrical Networks"; Brown Boveri Review, Feb. 1981 (BBC Publication No. CH-ES 35-30.10E); pp. 87-93.

* cited by examiner

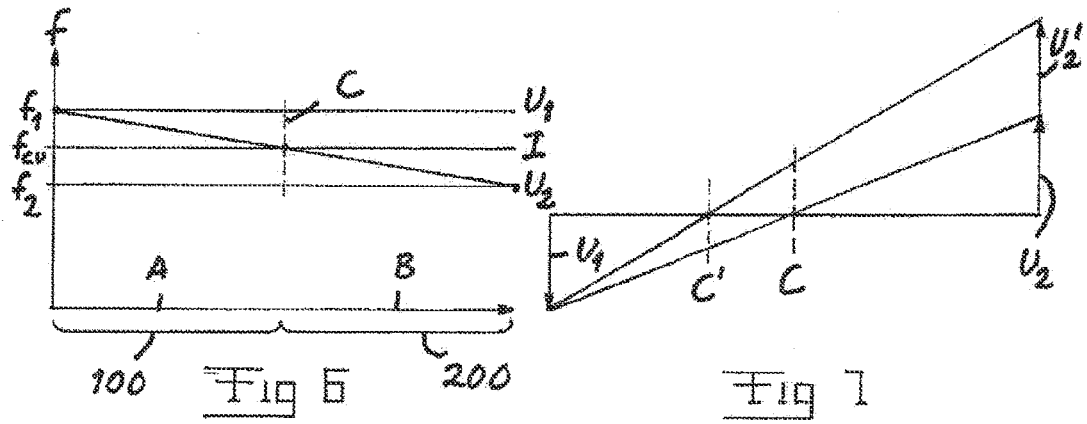
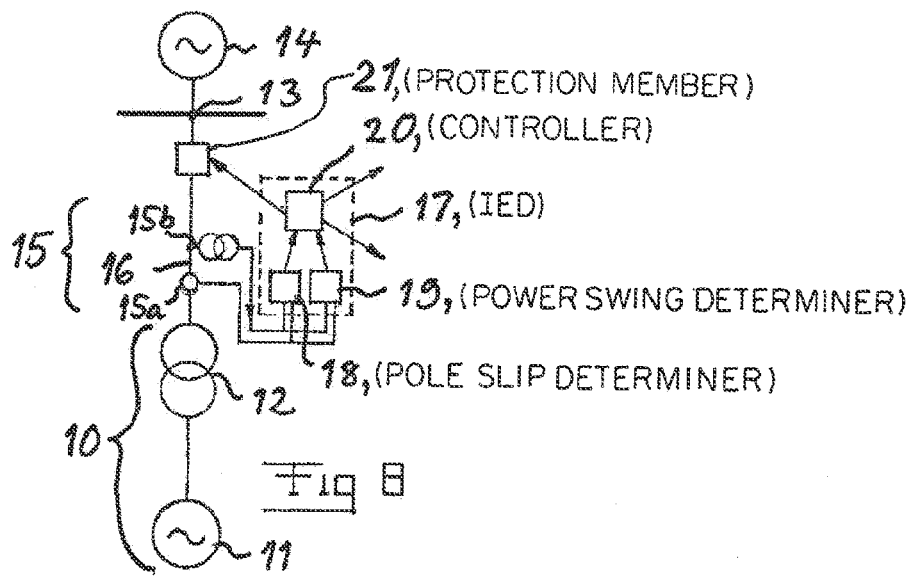
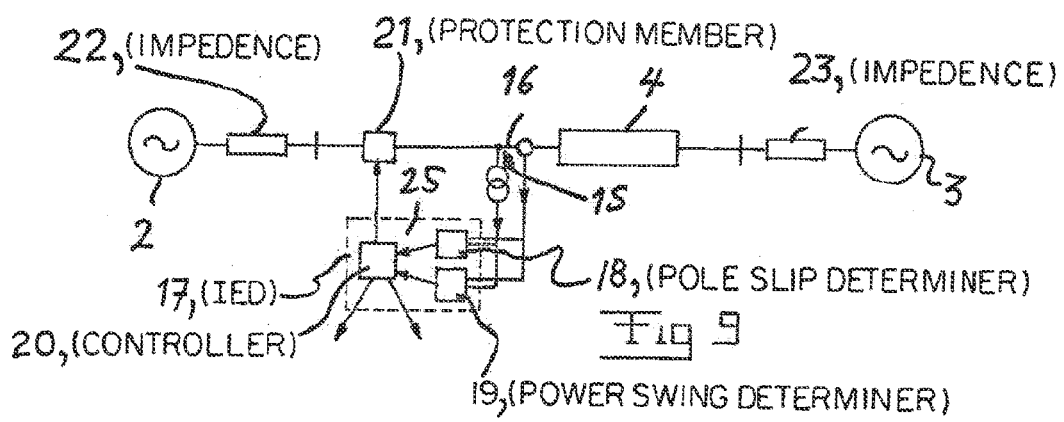

ARRANGEMENT FOR PROTECTING EQUIPMENT OF A POWER SYSTEM

CROSS-REFERENCE TO RELATED APPLICATIONS

The present application is a continuation of pending International patent application PCT/EP2009/057350 filed on Jun. 15, 2009 which designates the United States and the content of which is incorporated herein by reference.

FIELD OF THE INVENTION

The present invention relates to an arrangement for protecting equipment of an AC electrical power system.

BACKGROUND OF THE INVENTION

Protection of AC electrical power systems of any conceivable type is comprised, and such a system does typically, but not necessarily, among others include generators of electric power, transformers, converters and networks for transmitting electric power. Furthermore, the present invention is not restricted to any particular levels of electrical powers, voltages or currents of such electrical power systems.

Sudden events in such an electrical power system, such as large jumps in load, fault occurrence or slow fault clearance, which disturb the balance of energy in the system, can cause oscillations of mechanical masses, such as accelerations of rotors in electrical machines of the system, and such oscillations disturbing said balance are referred to and here defined as power swings. In a recoverable situation these oscillations will decay and stable operation will be resumed, which may be obtained by means of different control equipment of the electrical power system, such as control systems for an electrical generator being a part of the system. However, in a non-recoverable situation, the power swings become so severe that the synchronism is lost between different parts of the system, such as generators thereof, which is a condition referred to as pole slipping or out-of-step in the literature. We will hereinafter use "pole slip" for such a condition, which accordingly is the same as "out-of-step condition". In the case of a pole slip the excitation of electrical machines of the power system is generally intact, but there are strong oscillations of real and reactive power due to different rotational speed of involved machine rotors. Apart from the electrical phenomena, oscillations of mechanical masses also expose generators and/or other equipment of the power system to considerable pulsating mechanical stresses. Even though modern electrical power systems are designed and operate with high degree of security against power swings and even more against pole slipping, these two phenomena may occur especially during abnormal system conditions. If a pole slip is allowed to persist in one part of a power system then other electrical machines/equipment may follow and we do not only have an immediate risk of damaging bearings of rotors and other mechanical parts, but the stability of a complete electrical power system may be lost and complete blackout of the power system may be the final outcome.

It is from the above disclosure obvious that it is important to have arrangements for protecting equipment of electrical power systems against detrimental influences of power swings and pole slips, since these may otherwise cause enormous costs. In the case of severe faults it may be absolutely necessary to isolate a part of the electrical power system from the rest thereof, but it is also of importance to be able to determine whether a power swing is recoverable or not, since false tripping of such a protecting arrangement must be avoided, since that would result in a waste of considerable costs. Arrangement of this type either isolating an electrical machine, such as a generator, from the rest of the system or splitting the system at predetermined points have for this sake been proposed.

It has in the past been found that it is suitable to try to consider the electrical power system as an equivalent two machine system having at each of opposite ends thereof one theoretical electrical machine with an electro-motive force and an interconnection therebetween for being able to provide information relating to occurrence of a pole slip, i.e. that pole slip may or will occur or has occurred. The application of this model is possible if the electrical power system may be divided into two parts interconnected by a radial link-like power flow path.

The theory of this approach for obtaining protection of an electrical power system will now be briefly explained while referring to the appended FIGS. 1-3. It is shown in FIG. 1 how the electrical power system is considered as an equivalent two machine system 1 having at each opposite ends thereof one theoretical electric machine 2, 3 with an electro-motive force and an inter-connection 4 shown as an impedance. The two machines have the electro-motive forces $E_2$ and $E_3$ shown in FIG. 2 and here having the same magnitude. Furthermore, it is here assumed that the resistive part is quite small and thus negligible. The current I flowing between the two machines lags the vector difference $E_2-E_3$ by exactly 90° if it is assumed that the impedance is purely inductive. The angle between the two electro-motive forces $E_2$ and $E_3$ is $\delta$. $\phi$ is the angle between the voltage U and the current at a given location and varies along the connection between the two electric machines 2, 3, whereas $U \cos \phi$ is constant along this connection.

The angle $\delta$ between the electro-motive forces $E_2$ and $E_3$ of said theoretical machines is changing during a power swing, and if the power swing is non-recoverable this angle will finally go past 180°, which is defined as a pole slip. FIG. 3 is a graph showing the current I and $U \cos \phi$ versus said angle $\delta$. It appears that $U \cos \phi$ will decrease when a pole slip is approaching for being zero when $\delta$ is 180°, where then the current I is the highest, which may be very harmful for equipment of the electrical power system.

Thus, it is of importance to carry out measurement of such an electrical power system so as to detect electrical parameters of interest for providing information relating to occurrence of a pole slip, and this has so far mainly been done according to two principles.

One of these principles is based on detection of rate of change of $U \cos \phi$, and this principle is further described in for instance "Innovations in the Detection of Power Swings in Electrical Networks", Brown Boveri Review February 1981 (BBC Publication Number CH-ES 35-30.10E) by F. Ilar. Different conditions to be met for declaring a pole slip are mentioned in that document, such as the rate of change of $U \cos \phi$, which is typically in the order of 0.2-8 Hz for a pole slip condition, and passing of a threshold value of $U \cos \phi$ The other principle is based on detection of rate of change of the impedance of the interconnection of the two theoretical electric machines of the equivalent two machine system and is disclosed in for instance IEEE PSRC Tutorial 95 TP 102, "IEEE Tutorial on the Protection of Synchronous Generators". This principle is among others based on the understanding that when a measured impedance point crosses a line in an impedance plane this will be the exact moment when a pole slip occurs. However, this theory is based upon a rather rough estimation of impedances of the electrical power systems.

It is of course an ongoing attempt to increase reliability of arrangements of the type defined in the introduction for only tripping equipment when absolutely necessary and then ensuring that this is obtained before any costly equipment of the system is harmed. It is also a desire to increase the possibilities to recover the balance of the electrical power system without disconnecting any parts thereof from the rest of the system when this is at all doable.

SUMMARY OF THE INVENTION

The object of the present invention is to provide an arrangement of the type defined in the introduction being improved in at least some aspect with respect to such arrangements already known. In one embodiment, the arrangement for protecting equipment of an AC electrical power system may comprise: first means configured to detect electrical power parameters of said power system, second means configured to, while considering said electrical power system as an equivalent two machine system having at each of opposite ends thereof one theoretical electric machine with an electro-motive force and an interconnection therebetween, use values of said parameters detected to provide information relating to occurrence of a pole slip in the electric power system defined as a condition in which a mutual angle of the electro-motive forces of said two theoretical electrical machines goes past 180°, and third means configured to, based upon said information, carry out a control for protecting equipment of said electrical power system.

This object is according to the invention obtained by providing such an arrangement with the following additional features: said first means is configured to measure the frequency of the current and voltage at at least one location in the electrical power system along said interconnection between said two theoretical electric machines, and the arrangement comprises fourth means configured to use the values of the frequency of the current and voltage measured by said first means to determine whether a power swing has occurred in said electrical power system, a power swing being defined as a change of said angle between said electro-motive forces as a consequence of an occurrence of any disturbances of said electrical power system, and if an occurrence of a power swing has been determined determine whether said measuring location is located on a motor side or a generator side of a potential pole slip electrical center along said interconnection, said center being defined as the location where the voltage becomes zero during a said pole slip, is located and send this information further to said third means for use in said control for protecting the electrical power system.

Thus, the present invention is based on the new approach to use results of frequency measurements of current and voltage at at least one location in the electrical power system along the interconnection between said two theoretical electrical machines for determining where a potential pole slip electrical center is located. This determination of the location of the potential pole slip electrical center will not be dependent upon any estimation of impedances of the electrical power system and will be very reliable. Furthermore, it may by this way of proceeding very early be determined where measures as isolation of equipment shall later on be taken would a pole slip occur and start of control procedures for obtaining recovery of any unbalances may start early for, when possible, avoiding isolation or tripping of equipment of the electrical power system.

According to an embodiment of the invention said fourth means is configured to determine that a power swing occurs if said values of the frequency of the current and voltage delivered by said first means show that the measured current phasor start to rotate faster/slower than the measured voltage phasor and the relative angle thereof is continuously increasing/decreasing. Accordingly, it may in this way be determined that a power swing in fact occurs, so that it may be decided on which side, generator side or motor side, of said potential pole slip electrical center the measuring location is located for use in protecting equipment of the electrical power system.

According to another embodiment of the invention said fourth means is configured to, upon determination of occurrence of a said power swing, determine that said location is located on a motor side of said potential pole slip electrical center in said two machine system if the frequency of the current measured by said first means is higher than the frequency of the voltage at said location and determine that said location is located on a generator side of said potential pole slip electrical center is located on a motor side of said location in said two machine system if the frequency of the current measured by said first means is lower than the frequency of the voltage at said location. It may by very simple and reliable means by use of the result of these frequency measurements be decided on which side of a potential pole slip electrical center a said measuring location is located, so that appropriate actions may be taken for protecting the electrical power system.

Accordingly, the present inventor has by this provided a method for determining the location of a potential pole slip electrical center for an AC electrical power system, in which this electrical power system is considered as an equivalent two machine system having at each of opposite ends thereof one theoretical electric machine with an electro-motive force and an interconnection therebetween, the frequency of the current and voltage at at least one location in the electrical power system along said interconnection between said two theoretical electrical machines are measured, the values of the frequency of the current and voltage measured are used to determine whether a power swing has occurred in said electrical power system, and if an occurrence of a power swing has been determined it is determined whether said measuring location is along said interconnection located on a motor side or a generator side of a potential pole slip electrical center.

According to another embodiment of the invention said first means is configured to measure the frequency of the current and voltage at a further said location, and said fourth means is configured to, upon determination of occurrence of a power swing, determine that said further location is located on a motor side of said potential pole slip electrical center in said two machine system if the frequency of the current measured by said first means is higher than the frequency of the voltage at said further location and determine that said further location is located on a generator side of said potential pole slip electrical center in said two machine system if the frequency of the current measured by said first means is lower than the frequency of the voltage at said further location. By measuring on said further location and comparing the result of this measurement with the result of the measurement on the location first mentioned it may be determined on which side of these locations said potential pole slip electrical center is located.

According to another embodiment of the invention the arrangement is configured to protect an electrical power system having a block of a generator and a transformer connected through a high voltage station to a high voltage system for transmitting electric power, the arrangement comprises said first means located in the interconnection between said generator/transformer-block and said high voltage station, and said third means is configured to, upon receipt of information from said second means relating to occurrence of a pole slip and information from said fourth means that the measuring location is located on the motor side of said electrical center in the two machine system, influence equipment controlling the operation of said generator/transformer-block in the direction of obtaining stability of the electrical power system and/or control a member to disconnect said generator from said high voltage power system or stop the operation of said generator. Thus, the two theoretical electric machines of the equivalent two machine system are here on one hand said generator/transformer-block and on the other said high voltage system, and it will by an arrangement of this type be early and reliably determined on which side of said potential pole slip electrical center the measuring location is located. Furthermore, if it is determined that the measuring location is located on the motor side, the control systems of the generator may first be influenced for trying to obtain appropriate operation of the generator so as to recover balance in the electrical power system and if this is not succeeded the generator may be tripped and disconnected from the high voltage system before any pole slip occurs. When on the other side it is determined that the measuring location is located on the generator side of said electrical center in the two machine system it may be waited a predetermined period of time after occurrence of a said pole slip and when the electrical power system is then still unstable the generator/transformer-block will be disconnected from the high voltage power system. Thus, a possible positive result of any correction actions or the like carried out in said high voltage power system may be awaited, so that said generator/transformer-block is not disconnected before this is really necessary for protection thereof and by that such disconnection may be avoided if it is not absolutely necessary.

According to another embodiment of the invention the arrangement is configured to protect an electrical power system having a synchronous machine operating as a motor connected through a high voltage station to a high voltage system for transmitting electric power, said first means is located in the interconnection between said synchronous machine and said high voltage station, and that said third means is configured to, upon receipt of information from said second means relating to occurrence of a pole slip and information from said fourth means that the measuring location is located on the generator side of said electrical center in the two machine system, influence equipment controlling the operation of said synchronous machine in the direction of obtaining stability of the electrical power system and/or control a member to disconnect said synchronous machine from said high voltage power system or stop the operation of said synchronous machine. The arrangement according to the invention has the same positive features for the case of a synchronous machine operating as a motor as for a generator.

According to another embodiment of the invention the arrangement is configured to protect an electrical power system in the form of a main electrical power system including a first and a second electrical power system and an interconnection therebetween, said fourth means is located at one end of said interconnection connecting to said first electrical power system, that the arrangement comprises a device configured to use the values of the frequency of the current and voltage measured by said first means at said end of the interconnection and based upon information of properties of said interconnection stored in a memory carry out a calculation so as to estimate the voltage and current phasors prevailing at the other end of said interconnection connecting to the second electrical power system, and said fourth means is configured to, upon determination of occurrence of a said power swing, determine a) that said electrical center is located within said interconnection if the frequency of the current is higher than the voltage frequency on one end of the interconnection and at the same time the current frequency is lower than the voltage frequency on the other end of the interconnection and b) that said electrical center is located in the electrical power system located at the interconnection end with the smallest difference between current frequency and voltage frequency if the current frequency is at both ends of said interconnection at the same time either higher or lower than the voltage frequency. In which part of an electrical power system in the form of two interconnected electrical power systems a potential pole slip electrical center is located may by simple means by this be reliably and early (see above) obtained, so that relevant measures for protecting equipment of the main electrical power system may be taken. Thus, it is only necessary to measure the frequency of voltage and current at one location and by means of information of properties of said interconnection determine where said electrical center is located.

According to another embodiment of the invention being a further development of the embodiment last mentioned said third means is configured to, upon information from said second means relating to occurrence of a pole slip for a previous determination according to a) by said fourth means control a member to disconnect said interconnection from the electrical power systems before or after occurrence of a pole slip in order to minimize its impact on said two electrical power systems and for a previous determination according to b) by said fourth means influence equipment controlling the operation of components of said electrical power system having said electrical center in the direction of obtaining stability of this system and/or control a member to disconnect this electrical power system from said interconnection.

According to a still further embodiment of the invention the arrangement is configured to protect an electrical power system in the form of a meshed electrical power network, said first means is configured to measure the frequency of the current and voltage at at least two locations in said meshed electrical power network, said measuring locations are selected so that measuring is carried out by said first means in the same power flow corridor within the network enabling said second means to consider said meshed electrical power network as an equivalent two machine system, and said fourth means is configured to, upon determination of occurrence of a said power swing, determine a) said electrical center will be somewhere in between said two measurement locations within said meshed electrical power network if the current frequency is on one said measuring location higher than the voltage frequency and at the same time the current frequency is lower than the voltage frequency on said other location, and b) said electrical center is located outside the part of the meshed electrical power network limited by said measurement locations and with respect thereto after the one of the two measuring locations with the smallest difference between the current frequency and the voltage frequency if at both said measuring locations the current has at the same time either higher or lower frequency than the voltage. Measurements of frequency of voltage and current and evaluation of the result thereof may in this way be used for obtaining the main task for pole slip protection of a meshed electrical power network, i.e. to detect whether the potential pole slip electrical center is located within the part of the electrical power network limited by the measurement locations. This information may then be used for deciding if any part of said meshed electrical power network between said measurement locations is to be disconnected or other type of correcting measures are to be taken.

Said fourth means may then be configured to determine that a power swing occurs in said meshed electrical power network if said values of the frequency of the current and voltage delivered by said first means show that the measured current phasor starts to rotate faster/slower than the measured voltage phasor at any of said two measuring locations and the relative angle of said current phasor and voltage phasor is continuously increasing/decreasing.

According to another embodiment of the invention the arrangement is configured to protect an electrical power system in the form of a meshed electrical power network having PMUs (Phasor Measurement Units) on a plurality of different locations within the meshed electrical power network, said second means is configured to consider, at each said location of a PMU, the two parts of said meshed electrical power network interconnected there as a said equivalent two machine system. By using distributed measurements from a suitable number of PMUs and considering the two parts of said meshed electrical power network interconnected at such a location as a said equivalent two machine system it may be possible to detect in which part of said meshed power electrical network a potential pole slip electrical center is located. It is then important to properly select locations for the PMUs in order to cover the entire network. Said fourth means is then configured to use the values of the frequency of the current and voltage measured by said PMUs at each said location to determine whether a power swing has occurred in said meshed electrical power network and if an occurrence of a power swing has been determined determine that a location of a PMU where a measured current frequency is higher than a measured voltage frequency is on a motor side of the meshed power electrical network and that a location of a PMU where a measured current frequency is lower than the measured voltage frequency is on a generator side of the meshed electrical power network, and according to another embodiment of the invention said fourth means is configured to utilise information from all said PMUs with respect to said locations on motor side or generator side to determine in which part of said meshed electrical power network a potential pole slip electrical center is located. It will by this be possible to take any conceivable corrective actions before the first pole slip occurs in order to minimize its impact on the rest of said meshed electrical power network. Said fourth means is then configured to determine that a power swing has occurred within said meshed electrical power network if at any of said measuring locations the measured current phasor starts to rotate faster/slower than the measured voltage phasor and the relative angle of the current phasor and the voltage phasor is continuously increasing/decreasing.

The invention also relates to a method for protecting an AC electrical power system. The advantages and the advantageous features thereof and of embodiments according to the invention of said method appear clearly from the above disclosure of the arrangement according to the present invention.

The method according to the invention is well suited to be carried out by a computer and the invention does therefor also relate to a computer program and a computer program product.

Furthermore, the invention also relates to an AC electrical power system comprising an arrangement for protecting equipment of said power system according to the invention as well as a use of such an arrangement for protecting equipment of an AC electrical power system.

Further advantages as well as advantageous features of the invention will appear from the following description.

BRIEF DESCRIPTION OF THE DRAWINGS

With reference to the appended drawings below follows a specific description of embodiments of the invention cited as examples.

FIG. 6 is a simplified graph of frequency of the voltage versus the location on the interconnection shown in FIG. 4;

FIG. 7 is a very simplified graph illustrating the influence of the magnitude of voltage at the two ends of the two machine system shown in FIG. 4 upon the location of a potential pole slip electrical center;

FIG. 8 is a simplified view illustrating an arrangement according to a first embodiment of the invention applied to an electrical power system having a block of a generator and a transformer connected through a high voltage station to a high voltage system for transmitting electric power;

FIG. 9 is a view similar to FIG. 8 of an arrangement according to a second embodiment of the invention for protecting an electrical power system in the form of a main electrical power system including a first and a second electrical power system and an interconnection therebetween;

DETAILED DESCRIPTION OF THE INVENTION

Figure 1:
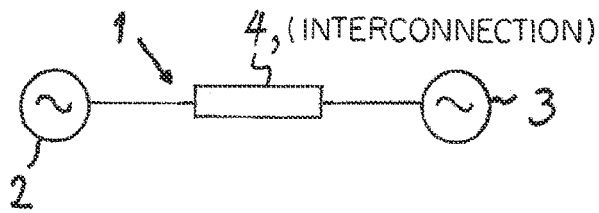
FIG. 1 is a very simplified view illustrating an AC electrical power system in the form of an equivalent two machine system.
Figure 2:
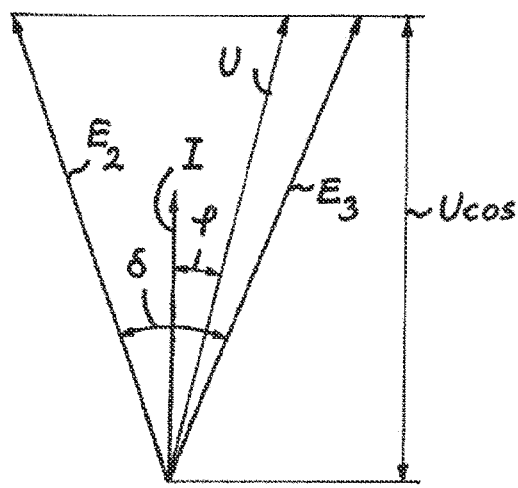
FIG. 2 is a vector diagram relating to the system according to FIG. 1.
Figure 3:
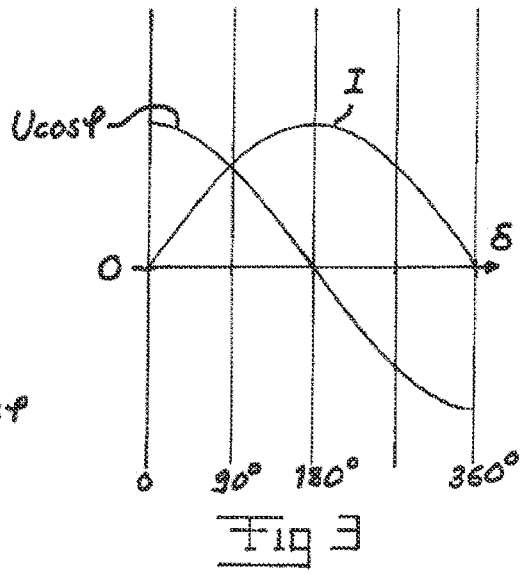
FIG. 3 is a graph showing U cos φ and I versus the angle δ made by the electro-motive forces of the two machines in FIG. 1.
Figure 4:
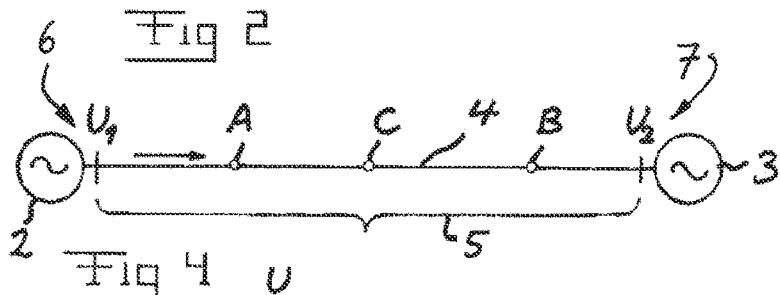
FIG. 4 is a simplified view of a said equivalent two machine system used for explaining the present invention.
Figure 5:
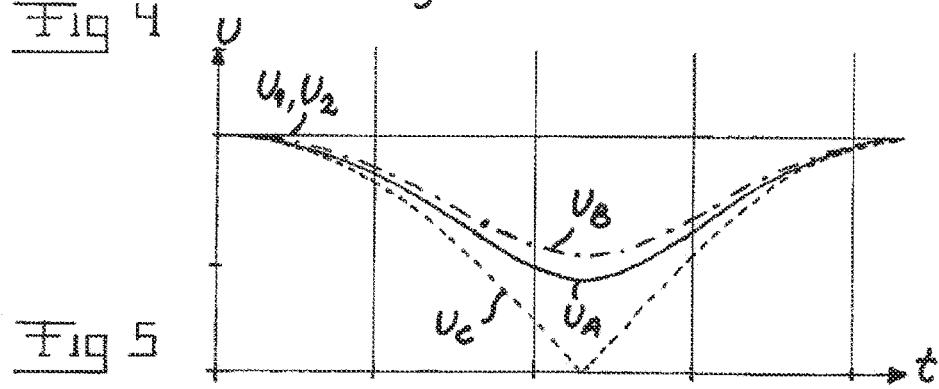
FIG. 5 is a simplified graph of voltage versus time on different locations in FIG. 4 during pole slip.

The theory upon which the present invention is based, i.e. to measure the frequency of the current and voltage at at least one location in an electrical power system along an interconnection between two theoretical electrical machines of an equivalent two machine system for determining the location of a potential pole slip electrical center will now be explained while referring to FIGS. 4-7. FIG. 4 illustrates a two machine system as shown in FIG. 1 in the form of two electrical machines 2, 3 interconnected by an interconnection 4 having an impedance indicated by 5. The two ends of the interconnection are indicated at 6 and 7, where the voltage is $U_1$ and $U_2$, respectively. Monitored locations in this and following figures along the interconnection are marked with A, C and B. The location C corresponds to the potential pole slip electrical center of the system. FIG. 5 shows how the voltage magnitude U on the different locations varies over time during pole slip, and it appears that the voltage is zero in the location C, i.e. in said electrical center, when pole slip occurs.

We define that a power swing occurs if the values of the frequency of the current and the voltage show that the current phasor starts to rotate faster/slower than the voltage phasor and the relative angle thereof is continuously increasing/decreasing, and we do here assume that the frequency $f_1$ at the location 6 is higher than the frequency $f_2$ at the location 7 for explaining the power swing and pole slip phenomena. The frequency of the current $f_{cu}$ is the same along the radial system as shown in the graph of FIG. 6 and is the same as the mean frequency $((f1+f2)/2)$ of the two voltages at 6 and 7. $U \cos \phi$ is at every moment constant along the radial link interconnecting the location 6 and 7. The phase angle difference between current and voltage measured at the potential pole slip electrical center is almost constant, which means that these two quantities have the same rotational speed and accordingly identical frequency there. This means that said electrical center C will be located where the frequency line of the voltage intersects the frequency line of the current (see FIG. 6). This understanding may be utilised to determine on which side of such an electrical center a location for measuring the frequency of current and voltage will be located. Thus, if such a measurement is carried out and the voltage phasor rotates faster than the current phasor in the complex plane, this location will be to the left of the electrical center C, i.e. the side 100 referred to generator mode of operation during pole slip. This does then mean that if the current phasor rotates faster than the voltage phasor in the complex plane, the measurement location will be to the right of the point C, i.e. the side 200 referred to motor mode of operation during pole slip.

FIG. 7 illustrates how the location of said potential pole slip electrical center is dependent upon the relative magnitude of the voltages at the two ends of the interconnection 4, and it is shown that this electrical center will be located closer to the end with the lowest magnitude of the voltage.

An arrangement according to the first embodiment of the invention is very schematically illustrated in FIG. 8. This arrangement is configured to protect an electrical power system having a block 10 of a generator 11 and a transformer 12 connected through a high voltage station 13 to a high voltage system 14 for transmitting electric power. This high voltage system 14 may be considered as an electrical machine with infinite power in an equivalent two machine system. The arrangement has first means 15 located in the interconnection between the generator/transformer block 10 and the high voltage station 13 and configured to measure the frequency of the current (15a) and voltage (15b) at this location 16. The arrangement further comprises a relay in the form of an Intelligent Electronic Device IED 17 including second means (or pole slip determiner) 18 receiving values of frequency of the current and the voltage measured and configured to, while considering the electrical power system as an equivalent two machine system having at each of opposite ends thereof one theoretical electric machine with an electro-motive force and an interconnection therebetween, use these values to provide information relating to occurrence of a pole slip in the electric power system defined as a condition in which a mutual angle of the electro-motive forces of said two theoretically electric machines goes past 180° as disclosed above. The arrangement also comprises fourth means (or power swing determiner) 19 receiving said measurement values and configured to use these values of the frequency of the current and voltage measured to determine whether a power swing has occurred in said electrical power system, a power swing being defined as a change of the angle δ between said electro-motive forces as a consequence of an occurrence of any disturbances of the electrical power system, and if an occurrence of a power swing has been determined determine whether said location 16 is along said interconnection located on the motor side or generator side of a said potential pole slip electrical center, defined as the location where the voltage becomes zero during a said pole slip, is located. Accordingly, this is done by utilising the theory presented above with reference made especially to FIG. 6. The fourth means will send this information further to third means (or controller) 20 also included in said IED, which is configured to based upon information from the second and fourth means carry out a control for protecting equipment of the electrical power system. When a power swing occurs and it is determined that the measuring location 16 is located on the motor side of said electrical center equipment controlling the operation of the generator/transformer-block may be influenced in the direction of obtaining stability of the electrical power system and/or a protection member 21, such as a breaker or a disconnector may be controlled to disconnect the generator from the high voltage power system, or the operation of the generator may be stopped. To the contrary, if it is determined that the measuring location 16 is located on the generator side of said potential pole slip electrical center it will be possible to wait a predetermined period of time after occurrence of a said pole slip, possibly until 2 or 3 pole slips have occurred and then disconnect the generator/transformer-block from the high voltage power system for protecting this block if the electrical power system is still unstable. This also means that if the balance of the electrical power system is recovered after a first pole slip said block will never be disconnected because this is not necessary for protecting it, which results in a considerable saving of costs with respect to prior art arrangements which may disconnect the block as soon as a pole slip occurrence has been determined without considering the location of the pole slip electrical center.

FIG. 9 illustrates an arrangement according to a second embodiment of the invention configured to protect an electrical power system in the form a main electrical power system including a first 2 and a second 3 electrical power system and an interconnection 4 therebetween. The parts of the arrangement according to this embodiment corresponding to parts of the embodiment shown in FIG. 8 are here provided with the same reference numerals. The interconnection is here represented by an impedance. Thus, the two power systems and the interconnection form a radial link, so that the two machine theory is fully applicable. Said first means 15 is configured to measure the frequency of current and voltage at a location 16 on one side of the interconnection 4. Furthermore, the arrangement comprises a device 25 configured to use values of the frequency of current and voltage measured and based upon information of properties of the interconnection stored in a memory carry out a calculation while using any of different known models so as to estimate the voltage and current phasors prevailing at the other end of the interconnection 4. Said properties are the impedances 22 and 23 and interconnection 4 impedance shown in FIG. 9. However, in the practise only the interconnection 4 impedance is fixed and well known while the two source impedances 22, 23 are varying and very much dependent on actual connection status of both power systems. Said fourth means 19 included in said IED is configured to, upon determination of occurrence of a said power swing, determine a) that said electrical centre is located within said interconnection 4 if the frequency of the current is higher than the voltage frequency on one end of the interconnection and at the same time the current frequency is lower than the voltage frequency on the other end of the interconnection and b) that said electrical center is located in the electrical power system located at the interconnection end with the smallest difference between current frequency and voltage frequency if the current frequency is at both ends of said interconnections at the same time either higher or lower than the voltage frequency. By gaining knowledge in which part of the electrical power system said potential pole slip electrical centre is located appropriate measures may be taken for protecting the system as disclosed above.

Figure 10:
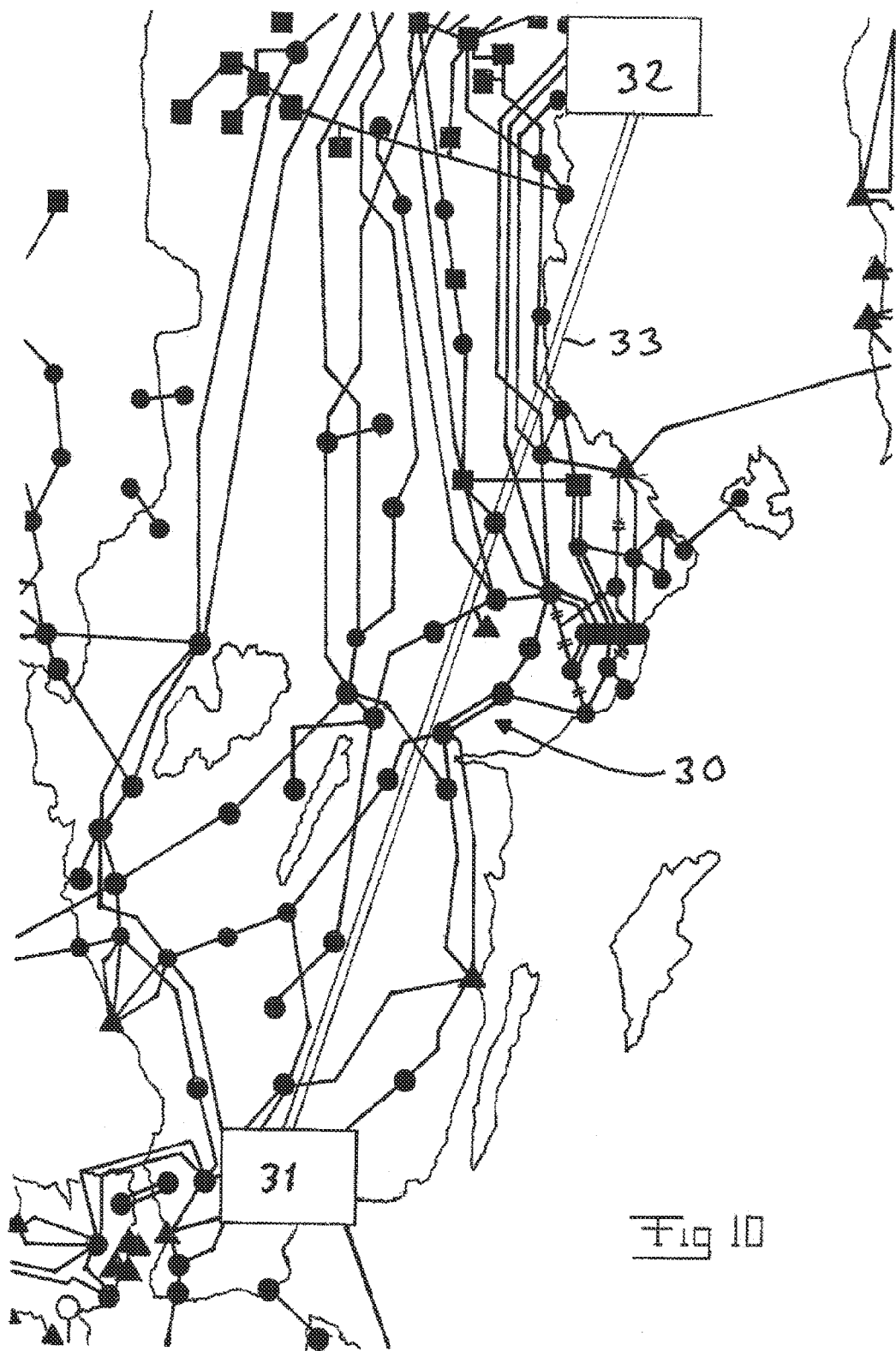
FIG. 10 is a simplified view illustrating how an arrangement according to a third embodiment of the invention may be applied to protect an electrical power system in the form of a meshed electrical power network.
Figure 11:
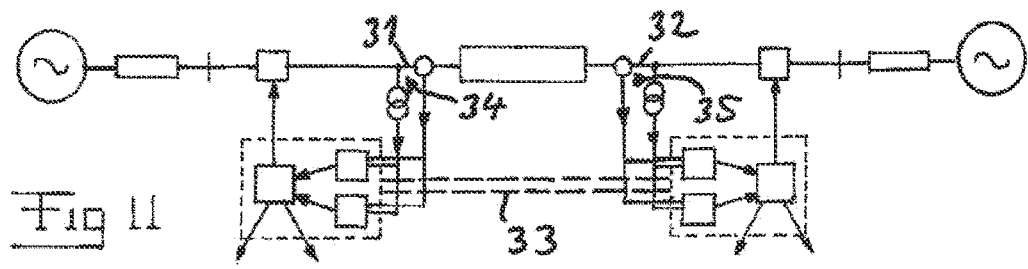
FIG. 11 is a view similar to FIG. 8 of the equivalent two machine system of the network shown in FIG. 10.

FIG. 10 illustrates an electrical power system, the Swedish power system, in the form of a meshed electrical power network 30, and an arrangement according to a third embodiment of the invention is configured to protect this meshed electrical power network by selecting two locations 31, 32 for measuring the frequency of the current and voltage by first means 34, 35 so that these measurements will be carried out in the same power flow corridor within the network enabling said second means to consider said meshed electrical power network as an equivalent two machine system as shown in FIG. 11. Accordingly, the system shown in FIG. 11 only differs from that shown in FIG. 9 by the fact that measurements are here carried out at two different locations, namely at each end of the interconnection. This means that it is not necessary to be aware of the value of any impedances of said interconnection or of the two sources, but it may be relied only upon said frequency measurements for determining in which part of the equivalent two machine system shown in FIG. 11 a potential pole slip electrical center is located. A communication link 33 is here required for exchanging measurement values between the two locations 31 and 32.

Figure 12:
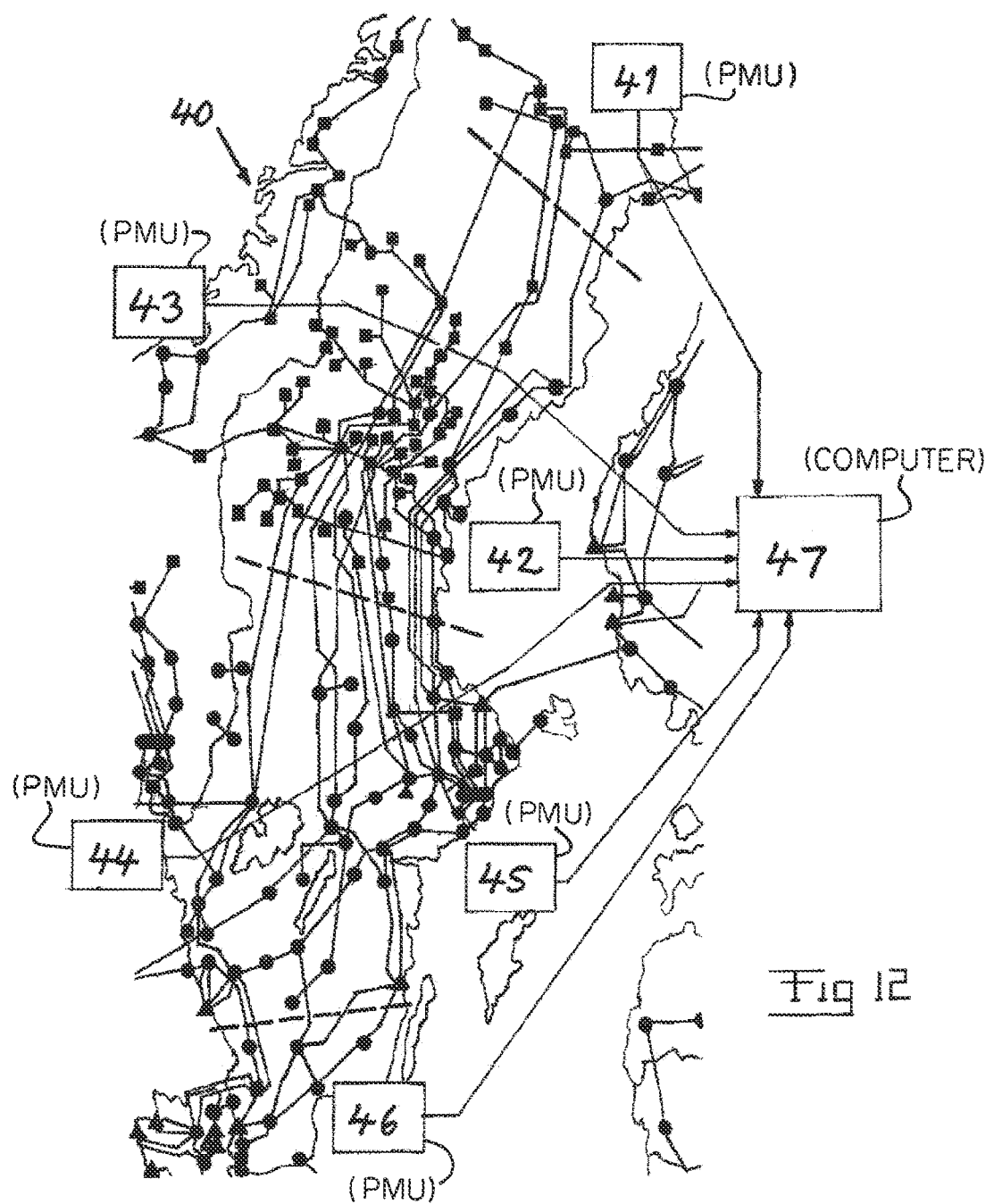
FIG. 12 is a view similar to FIG. 10 illustrating an arrangement according to a fourth embodiment of the invention for protecting an electrical power system in the form of a meshed electrical power network having PMUs distributed over a wide area.

Finally, FIG. 12 illustrates an electrical power system in the form of a meshed electrical power network 40 extending over a wide area, here in Sweden and adjacent countries, having PMUs (Phasor Measurement Unit) 41-46 on a plurality of different locations within the meshed electrical power network. It is important to properly select locations for the PMUs in order to cover the entire network. These PMUs makes it possible to measure the frequency of the current and voltage and determine the location of the current and voltage phasors in the complex plane with respect to a GPS signal, which means that the phase shift of these phasors on one location with respect to another location may be determined. Said second means is configured to consider at each said location of a PMU the two parts of said meshed electrical power network interconnected there as a said equivalent two machine system and the fourth means is configured to use the values of the frequency of the current and voltage measured by the PMUs at each said location to determine whether a power swing has occurred in said meshed electrical power network and if an occurrence of a power swing has been determined determine that a location of a PMU where a measured current frequency is higher than a measured voltage frequency is on a motor side of the electrical power network and that a location of a PMU where a measured current frequency is lower than the measured voltage frequency is on a generator side of the meshed electric power network. This information from all the PMUs with respect to said locations on motor side or generator side may then be used to determine in which part of said meshed power electrical network a potential pole slip electrical center is located. A computer 47 may through a suitable computer program carry out calculations for determining location of said potential pole slip electrical center, so that any possible corrective actions may be taken before the first pole slip occurs in order to minimize its impact on the rest of the electrical power network. Such actions may be to disconnect parts of the network or any equipment thereof.

The invention is of course not in any way restricted to the embodiments described above, but many possibilities to modifications thereof would be apparent to a person with skill in the art without departing from the scope of the invention.

As already mentioned above an arrangement according to the invention may be configured to protect other types of electrical power systems than those described above, and measuring of frequencies may be carried out on a different number of locations than shown in the figures.

The arrangement may be designed for protecting equipment of an AC electrical power system also having DC links connected thereto through converter stations.

It is pointed out that the second, third and fourth means in the arrangement according to the invention have not to be physically separated parts, but they may be summarized in one single object, such as a computer appropriately programmed.

What is claimed is:

1. An arrangement for protecting equipment of an AC electrical power system comprising:
   first means configured to detect electrical power parameters of said power system,
   second means configured to, while considering said electrical power system as an equivalent two machine system having at each of opposite ends thereof one theoretical electric machine with an electro-motive force and an interconnection therebetween, use values of said parameters detected to provide information relating to occurrence of a pole slip in the electric power system defined as a condition in which a mutual angle of the electro-motive forces of said two theoretical electrical machines goes past 180°, and
   third means configured to, based upon said information, carry out a control for protecting equipment of said electrical power system, characterized in that said first means is configured to measure the frequency of the current and voltage at at least one location in the electrical power system along said interconnection between said two theoretical electric machines, and that the arrangement comprises fourth means configured to use the values of the frequency of the current and voltage measured by said first means to determine whether a power swing has occurred in said electrical power system, a power swing being defined as a change of said angle between said electro-motive forces as a consequence of an occurrence of any disturbances of said electrical power system, and if an occurrence of a power swing has been determined determine whether said measuring location is located on a motor side or a generator side of a potential pole slip electrical centre along said interconnection, said centre being defined as the location where the voltage becomes zero during a said pole slip, and send this information further to said third means for use in said control for protecting the electrical power system, wherein said fourth means is configured to determine that a power swing occurs if said values of the frequency of the current and voltage delivered by said first means show that the measured current phasor start to rotate faster/slower than the measured voltage phasor and the relative angle thereof is continuously increasing/decreasing.

2. An AC electrical power system, characterized in that it comprises an arrangement for protecting equipment of said power system according to claim 1.

3. The arrangement according to claim 1, characterized in that it is configured to protect an electrical power system in the form of a main electrical power system including a first and a second electrical power system and an interconnection therebetween, that said fourth means is located at one end of said interconnection connecting to said first electrical power system, that the arrangement comprises a device configured to use the values of the frequency of the current and voltage measured by said first means at said end of the interconnection and based upon information of properties of said interconnection stored in a memory carry out a calculation so as to estimate the voltage and current phasors prevailing at the other end of said interconnection connecting to the second electrical power system, and that said fourth means is configured to, upon determination of occurrence of a said power swing, determine
   a) that said electrical centre is located within said interconnection if the frequency of the current is higher than the voltage frequency on one end of the interconnection and at the same time the current frequency is lower than the voltage frequency on the other end of the interconnection and
   b) that said electrical centre is located in the electrical power system located at the interconnection end with the smallest difference between current frequency and voltage frequency if the current frequency is at both ends of said interconnection at the same time either higher or lower than the voltage frequency.

4. The arrangement according to claim 3, characterized in that said third means is configured to, upon information from said second means relating to occurrence of a pole slip for a previous determination according to
   a) by said fourth means control a member to disconnect said interconnection from the electrical power systems before or after occurrence of a pole slip in order to minimize its impact on said two electrical power systems and for a previous determination according to
   b) by said fourth means influence equipment controlling the operation of components of said electrical power system having said electrical centre in the direction of obtaining stability of this system and/or control a member to disconnect this electrical power system from said interconnection.

5. The arrangement according to claim 1, characterized in that it is configured to protect an electrical power system in the form of a meshed electrical power network, that said first means is configured to measure the frequency of the current and voltage at at least two locations in said meshed electrical power network, that said measuring locations are selected so that measuring is carried out by said first means in the same power flow corridor within the network enabling said second means to consider said meshed electrical power network as an equivalent two machine system, and that said fourth means is configured to, upon determination of occurrence of a said power swing, determine
   a) that said electrical centre will be somewhere in between said two measurement locations within said meshed electrical power network if the current frequency is on one said measuring location higher than the voltage frequency and at the same time the current frequency is lower than the voltage frequency on said other location, and
   b) that said electrical centre is located outside the part of the meshed electrical power network limited by said measurement locations and with respect thereto after the one of the two measuring location with the smallest difference between the current frequency and the voltage frequency if at both said measuring locations the current has at the same time either higher or lower frequency than the voltage.

6. The arrangement according claim 5, characterized in that said fourth means is configured to determine that a power swing occurs in said meshed electrical power network if said values of the frequency of the current and voltage delivered by said first means show that the measured current phasor start to rotate faster/slower than the measured voltage phasor at any of said two measuring locations and the relative angle of said current phasor and voltage phasor is continuously increasing/decreasing.

7. The arrangement according to claim 1, characterized in that it is configured to protect an electrical power system in the form of a meshed electrical power network having PMUs (Phasor Measurement Units) on a plurality of different locations within the meshed electrical power network, and that said second means is configured to consider at each said location of a PMU the two parts of said meshed electrical power network interconnected there as a said equivalent two machine system.

8. The arrangement according to claim 7, characterized in that in that said fourth means is configured to determine that a power swing has occurred within said meshed electrical power network if at any of said measuring locations the measured current phasor starts to rotate faster/slower than the measured voltage phasor and the relative angle of the current phasor and the voltage phasor is continuously increasing/decreasing.

9. The arrangement according to claim 7, characterized in that said fourth means is configured to use the values of the frequency of the current and voltage measured by said PMUs at each said location to determine whether a power swing has occurred in said meshed electrical power network and if an occurrence of a power swing has been determined determine that a location of a PMU where a measured current frequency is higher than a measured voltage frequency is on a motor side of the meshed electrical power network and that a PMU where a measured current frequency is lower than the measured voltage frequency is on a generator side of the meshed electrical power network.

10. The arrangement according to claim 9, characterized in that said fourth means is configured to utilise information from all said PMUs with respect to said locations on motor side or generator side to determine in which part of said meshed electrical power network a potential pole slip electrical centre is located.

11. The arrangement according to claim 1, characterized in that said fourth means is configured to, upon determination of occurrence of a said power swing, determine that said location is located on a motor side of said potential pole slip electrical centre in said two machine system if the frequency of the current measured by said first means is higher than the frequency of the voltage at said location and determine that said location is located on a generator side of said potential pole slip electrical centre in said two machine system if the frequency of the current measured by said first means is lower than the frequency of the voltage at said location.

12. The arrangement according to claim 11, characterized in that said first means is configured to measure the frequency of the current and voltage at a further said location, and that said fourth means is configured to, upon determination of occurrence of a power swing, determine that said further location is located on a motor side of said potential pole slip electrical centre in said two machine system if the frequency of the current measured by said first means is higher than the frequency of the voltage at said further location and determine that said further location is located on a generator side of said potential pole slip electrical centre in said two machine system if the frequency of the current measured by said first means is lower than the frequency of the voltage at said further location.

13. The arrangement according to claim 11, characterized in that it is configured to protect an electrical power system having a synchronous machine operating as a motor connected through a high voltage station to a high voltage system for transmitting electric power, that said first means is located in the interconnection between said synchronous machine and said high voltage station, and that said third means is configured to, upon receipt of information from said second means relating to occurrence of a pole slip and information from said fourth means that the measuring location is located on the generator side of said electrical centre in the two machine system, influence equipment controlling the operation of said synchronous machine in the direction of obtaining stability of the electrical power system and/or control a member to disconnect said synchronous machine from said high voltage power system or stop the operation of said synchronous machine.

14. The arrangement according to claim 11, characterized in that it is configured to protect an electrical power system having a block of a generator and a transformer connected through a high voltage station to a high voltage system for transmitting electric power, that it comprises said first means located in the interconnection between said generator/transformer-block and said high voltage station, and that said third means is configured to, upon receipt of information from said second means relating to occurrence of a pole slip and information from said fourth means that the measuring location is located on the motor side of said electrical centre in the two machine system, influence equipment controlling the operation of said generator/transformer-block in the direction of obtaining stability of the electrical power system and/or control a member to disconnect said generator from said high voltage power system or stop the operation of said generator.

15. The arrangement according to claim 14, characterized in that said third means is configured to, upon receipt of information from said second means relating to occurrence of a pole slip and information from said fourth means that the measuring location is located on the generator side of said electrical centre in the two machine system, wait a predetermined period of time after occurrence of a said pole slip and when said second means then still delivers information that said electrical power system is unstable control said member to disconnect said generator/transformer-block from said high voltage power system.

16. A method for protecting an AC electrical power system comprising the steps of:
a) detecting electrical power parameters of said power system,
b) considering said electrical power system as an equivalent two machine system having at each of opposite ends thereof one theoretical electric machine with an electromotive force and an interconnection therebetween and using said parameters detected to provide information relating to occurrence of a pole slip in the electric power system defined as a condition in which a mutual angle of the electro-motive forces of said two theoretical electric machine goes past 180°, and
c) carrying out a control, based upon said information, for protecting equipment of said electrical power system, characterized in that said detecting in step a) comprises measuring of the frequency of the current and voltage at at least one location in the electrical power system along said interconnection between said two theoretical electric machines, that it comprises a further step d) carried out between step a) and b), or between step b) and c) and comprising determining, while using the values of the frequency of the current and voltage measured, whether a power swing has occurred in said electrical power system, a power swing being defined as a change of said angle between said electro-motive forces as a consequence of an occurrence of any disturbances of said electrical power system, and a step e) carried out if an occurrence of a power swing has been determined in step d) and comprising determining whether said measuring location is located on a motor side or a generator side of a potential pole slip electrical centre along said interconnection, said electrical centre being defined as the location where the voltage becomes zero during said pole slip, is located, wherein in step e) it is determined that a power swing occurs if said values of the frequency of the current and voltage measured show that the measured current phasor starts to rotate faster/slower than the measured voltage phasor and the relative angle thereof is continuously increasing/decreasing, and that in step c) information relating to the location of said potential pole slip electrical centre thus determined is used in said control for protecting the electrical power system.

17. The method according to claim 16, characterized in that upon determination of occurrence of a said power swing in step d) it is in step e) determined that the measuring location is located on a motor side of said potential pole slip electrical centre in said two machine system if the frequency of the current measured is higher than the frequency of the voltage at said location and determined that the measuring location is located on a generator side of said potential pole slip electrical centre in said two machine system if the frequency of the current measured is lower than the frequency of the voltage at said location.

18. A computer program product comprising a data storage medium readable by an electronic unit, the data storage medium storing a computer program loadable directly into the internal memory of a computer, which computer program comprises computer program code for causing the computer, for an AC electrical power system:
to obtain detection of electrical power parameters of said power system,
to calculate, while considering said electrical power system as an equivalent two machine system having at each of opposite ends thereof one theoretical electric machine with an electromotive force and an interconnection therebetween and while using said parameters detected, data relating to occurrence of a pole slip in the electrical power system defined as a condition in which a mutual angle of the electro-motive forces of said two theoretical electric machine goes past 180°,
to obtain a control, based upon said data, for protecting equipment of said electrical power system,
to obtain said detecting by obtaining measuring of the frequency of the current and voltage at at least one location in the electrical power system along said interconnection between said two theoretical electric machines,
to obtain determining, while using the values of the frequency of the current and voltage measured, whether a power swing has occurred in said electrical power system, a power swing being defined as a change of said angle between said electromotive forces as a consequence of an occurrence of any disturbances of said electrical power system, wherein it is determined that a power swing occurs if said values of the frequency of the current and voltage measured show that the measured current phasor starts to rotate faster/slower than the measured voltage phasor and the relative angle thereof is continuously increasing/decreasing,
to obtain determining whether said measuring location is located on a motor side or a generator side of a potential pole slip electrical centre along said interconnection, said centre being defined as the location where the voltage becomes zero during said pole slip, is located, and to obtain said control for protecting the electrical power system by using information relating to the location of said potential pole slip electrical centre thus determined.

19. Use of an arrangement for protecting equipment of an AC electrical power system, the arrangement comprising:

first means configured to detect electrical power parameters of said power system, second means configured to, while considering said electrical power system as an equivalent two machine system having at each of opposite ends thereof one theoretical electric machine with an electro-motive force and an interconnection therebetween, use values of said parameters detected to provide information relating to occurrence of a pole slip in the electric power system defined as a condition in which a mutual angle of the electro-motive forces of said two theoretical electrical machines goes past 180°, and third means configured to, based upon said information, carry out a control for protecting equipment of said electrical power system, characterized in that said first means is configured to measure the frequency of the current and voltage at at least one location in the electrical power system along said interconnection between said two theoretical electric machines, and that the arrangement comprises fourth means configured to use the values of the frequency of the current and voltage measured by said first means to determine whether a power swing has occurred in said electrical power system, a power swing being defined as a change of said angle between said electro-motive forces as a consequence of an occurrence of any disturbances of said electrical power system, and if an occurrence of a power swing has been determined determine whether said measuring location is located on a motor side or a generator side of a potential pole slip electrical centre along said interconnection, said centre being defined as the location where the voltage becomes zero during a said pole slip, and send this information further to said third means for use in said control for protecting the electrical power system, wherein said fourth means is configured to determine that a power swing occurs if said values of the frequency of the current and voltage delivered by said first means show that the measured current phasor start to rotate faster/slower than the measured voltage phasor and the relative angle thereof is continuously increasing/decreasing.

* * * * *